UNITED STATES PATENT OFFICE.

ALBERT HERRMANN, OF HÖCHST-ON-THE-MAIN, GERMANY, ASSIGNOR TO THE FARBWERKE, VORMALS MEISTER, LUCIUS & BRÜNING, OF SAME PLACE.

GREEN DYE AND PROCESS OF MAKING SAME.

SPECIFICATION forming part of Letters Patent No. 630,224, dated August 1, 1899.

Application filed December 12, 1898. Serial No. 699,022. (Specimens.)

*To all whom it may concern:*

Be it known that I, ALBERT HERRMANN, Ph. D., a citizen of the Empire of Germany, residing at Höchst-on-the-Main, Germany, have invented certain new and useful Improvements in the Manufacture of Green Dyestuffs, of which the following is a specification.

I have found that by adhering to appropriate conditions naphthalenedisulfonic acids may be condensed with tetralkyldiamidobenzhydrols in quantity into leucodisulfonic acids, and, further, that these leucodisulfonic acids yield, when oxidized, new dyestuffs, which, besides being fast to washing and light, dye very evenly in an acid-bath.

I illustrate my process by the following example: Twenty-seven kilos of tetramethyldiamidobenzhydrol and thirty-nine kilos of sodium salt of 1.3 naphthalenedisulfonic acid of eighty-five per cent. strength are well mixed, and the mixture is run into two hundred kilos of monohydrate sulfuric acid while well stirring. The thickened mass thus resulting is then heated in a boiling-water bath until a sample of it is clearly soluble in diluted ammonia—that is to say, till all hydrol has disappeared. This takes place after from five to six hours. The product of reaction is poured into water and transformed in the usual manner into the calcium or sodium salt. For the subsequent oxidation to a solution of five kilos of the leuco salt thus obtained in about forty liters of water is added the calculated quantity of sulfuric acid, and this liquid, while well stirring, is poured into 2.04 kilos of peroxid of lead mixed with water. The sulfate of lead is then filtered off, and the dye solution is evaporated to dryness.

The process is the same for producing other dyestuffs from tetralkyldiamidobenzhydrols and naphthalenedisulfonic acid by employing instead of tetramethyldiamidobenzhydrol mentioned in the example the equivalent quantity of tetraethyldiamidobenzhydrol and instead of the above mentioned 1.3 acid the naphthalenedisulfonic acids 1.4, 1.5, 1.6, 2.6, and 2.7.

The new dyestuffs differ very little in their properties. They are copper-colored powders of metallic luster, very easily soluble in water, soluble with great difficulty in alcohol, insoluble in benzene, and dye animal fiber green in an acid-bath, the tints being even and very fast to light.

Having now described my invention, what I claim is—

1. The process for the manufacture of green dyestuffs of the diphenylnaphthylmethane series and which consists in combining tetralkyldiamidobenzhydrols with naphthalenedisulfonic acids in presence of condensing agents to leucodisulfonic acids and in transforming these leucodisulfonic acids by oxidation into dyestuffs, substantially as described.

2. As a new product a dyestuff obtained by condensing tetralkyldiamidobenzhydrols with naphthalenedisulfonic acids and by oxidizing the resulting leuco compounds to dyestuffs, being a copper-red powder of metallic luster, easily soluble in water with a green color, soluble with difficulty in alcohol, insoluble in benzene, dyeing wool in an acid-bath an even green fast to light and of one probable constitution:

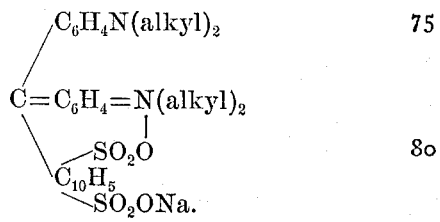

3. As a new product the dyestuff obtained by condensing tetralkyldiamidobenzhydrol with 1.3 naphthalenedisulfonic acid and by oxidizing the resulting leuco compound, the dyestuff being a copper-red powder of metallic luster, easily soluble in water with a green color, soluble with difficulty in alcohol, insoluble in benzene, dyeing wool in an acid-bath an even green, fast to washing and light and of the probable constitution:

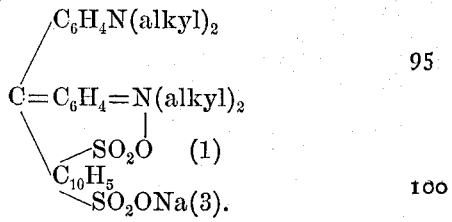

In testimony that I claim the foregoing as my invention I have signed my name in presence of two subscribing witnesses.

ALBERT HERRMANN.

Witnesses:
HEINRICH HAHN,
ALFRED BRISBOIS.